Jan. 15, 1935.  A. G. CLAVIER  1,987,989
SHORT WAVE OSCILLATION GENERATOR
Filed Nov. 26, 1930   2 Sheets-Sheet 1

INVENTOR
A. G. CLAVIER
BY *Guy T. Morris*
ATTORNEY

Jan. 15, 1935. A. G. CLAVIER 1,987,989
SHORT WAVE OSCILLATION GENERATOR
Filed Nov. 26, 1930 2 Sheets-Sheet 2
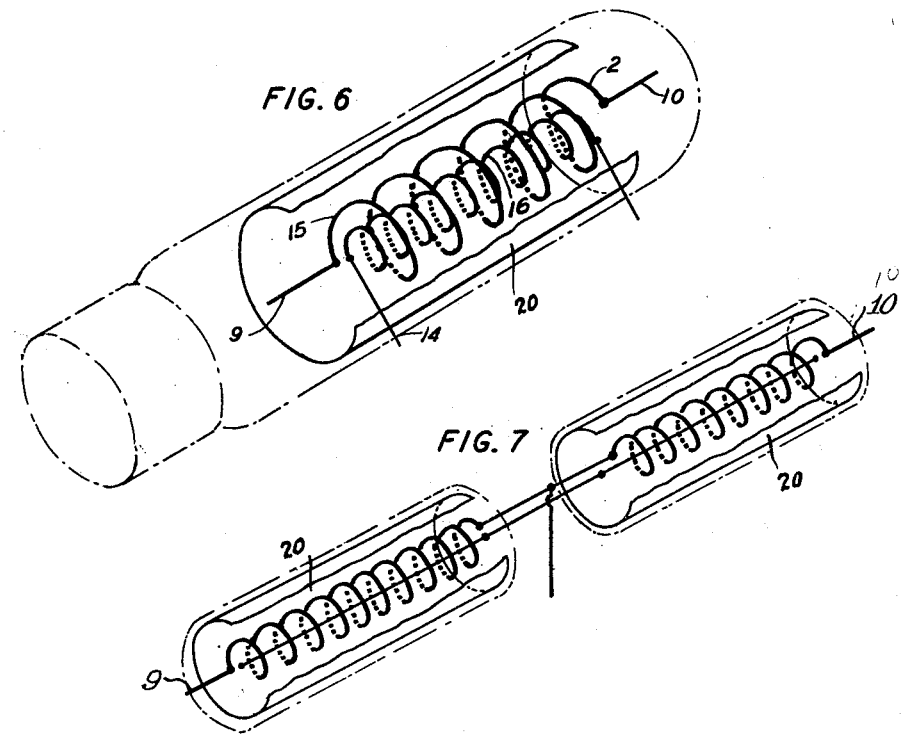
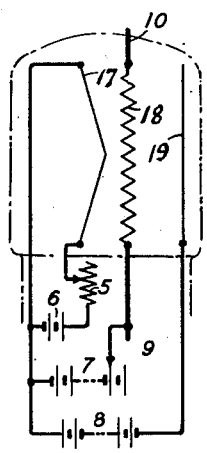
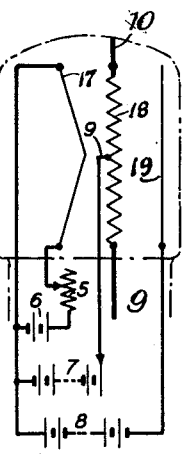
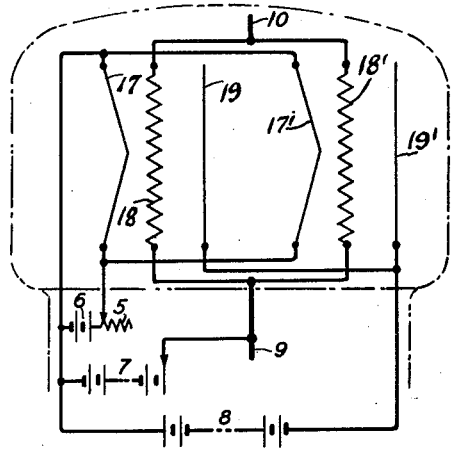
INVENTOR
A. G. CLAVIER
BY
ATTORNEY Patented Jan. 15, 1935

1,987,989

UNITED STATES PATENT OFFICE 1,987,989

SHORT WAVE OSCILLATION GENERATOR

André Gabriel Clavier, Paris, France, assignor to Western Electric Company, Incorporated, New York, N. Y., a corporation of New York Application November 26, 1930, Serial No. 498,256 In Great Britain December 3, 1929

3 Claims. (Cl. 250—36)

This invention relates to wave generating circuits and more particularly to such circuits as adapted to generate waves of very high frequency.

Various means have heretofore been used for obtaining very high frequency electrical oscillations, having wave lengths for example of the order of 20 centimeters to two meters.

One such means is the Barkhausen oscillation generator which comprises a three electrode discharge tube having a filament, a surrounding grid and an anode. A high positive potential is applied to the grid and zero or a negative potential to the anode. Under these conditions it is possible to obtain electrical oscillations. The frequency of the oscillations is determined primarily by the geometry of the tube and the applied potentials. Also it is possible to obtain electrical oscillations with the anode slightly positive.

Other means have been proposed in which a tube consisting of a cylindrical anode and axial filament is placed in a magnetic or electric field. A positive potential is applied to the anode and the field is adjusted so that it tends to cut off the anode current and is almost at the critical value for so doing. Under these circumstances, also, it is possible to produce electrical oscillations of very short wave lengths.

Among the disadvantages of the means heretofore proposed was their lack of ready adaptableness to practical use and one of the main objects of the present invention is to overcome this limitation though as will be mentioned later the present invention may also have advantages in other respects.

An object of this invention is to produce efficiently and/or utilize in a practicable way oscillatory electrical energy of very high frequency. The generator of the invention is characterized by having its frequency determined by the natural frequency of vibration of electrons in an electrostatic or magnetic field of predetermined value.

A feature of the invention is the use of a direct interaction of a plurality of electron streams, the movements of said electrons being adapted to set up oscillatory electrical energy in a conductor or circuit associated with the space discharge path in which the said electron streams interact.

Another feature of the invention relates to the use of a controlling or actuating electrode for biasing the said electron streams. This controlling or actuating electrode may be integral with the system in which electrical oscillatory energy is set up by the said electron streams.

A specific embodiment of the invention utilizes means for generating a plurality of pairs of opposed electron streams which are used to set up electrical oscillations in at least one unitary electrode. The said electrode or electrodes may be for example a prismatical grid structure although other widely different structures may be employed.

One or more auxiliary electrodes may be provided for biasing (e. g. concentrating etc.) the said electron streams. For instance such an auxiliary electrode may be used for accelerating the movement of at least one of said electron streams, one pair of such accelerating electrodes being so arranged that the frequency of oscillations obtainable with the addition of said electrodes is greater than without.

It is obvious that the electron streams above mentioned may be generated by any one of several methods well known in the art.

The electrode in which oscillatory electrical energy is set up by the movement of the electrons may be coupled to a radiating system extraneous to the vacuum tube in which the said streams of electrons are located or the said oscillations may be confined to the electrode itself and radiated therefrom without conductive connection to a radiating system.

In order to illustrate the above and other features of the invention a few embodiments of the invention will be described with reference to the accompanying drawings wherein:

Fig. 6 illustrates a schematic perspective view of a "transformer electrode";

Fig. 7 illustrates a plurality of devices each of which comprising all the elements of a single discharge device of the type described above, the corresponding elements of said devices being interconnected in series with each other;

Figs. 8 and 9 illustrate slightly different circuit arrangements which may conveniently be used for operating the device shown in Fig. 5; and Fig. 10 illustrates a circuit arrangement suitable for associating a plurality of electronic devices as in accordance with the invention, especially as illustrated by Fig. 5 with a single radiating system.

Figure 1:
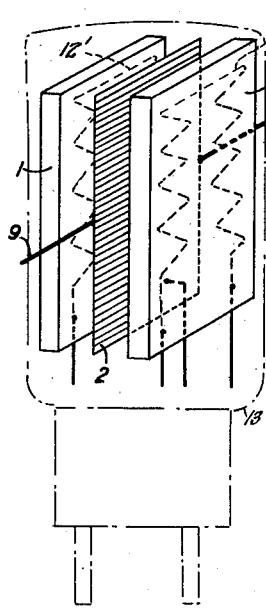
Fig. 1 illustrates an electronic device provided with controlling and actuating electrode in accordance with a feature of the invention.

Referring to Fig. 1 an electronic device is shown in which two sources of electrons are adapted to interact under the influence of a controlling and actuating electrode 2. In the example illustrated in Fig. 1 the sources of electrons 1 and 1' consist of two plane electrodes provided with heater wires 12' and 12 respectively, for instance an electric heater connected to the leading wires shown. The elements above are included in a glass envelope or other equivalent closure member 13.

The operation of the arrangement of Fig. 1 is as follows:

Under the influence of a sufficiently high positive potential applied to the controlling and actuating electrode, two opposed electron streams are attracted from the emissive electrodes 1 and 1' to the controlling and actuating electrode 2. Part of each one of said electron streams succeeds in traversing the meshes of said electrode 2 and then falls into a retarding field due to the other emissive electrode and the space charge surrounding same. Simultaneously each one of those portions of the said electron streams which have traversed the controlling and actuating electrode 2 and have their velocity progressively reduced by the said retarding field also then come under the similar influence of the potential applied to the controlling and actuating electrode 2. The electrons traverse again the electrode 2 and fall in a retarding field and the same process is renewed until the electrons considered have all been attracted on the conductive structure of the electrode 2 whereafter the said electrons cease to be effective in the process. However continuous oscillations of electrons occur due to the continuous effect of the two emissive electrodes 1 and 1'.

Experimentally it has been observed that a system of the above type, once started into oscillations, continues to oscillate with remarkably constant frequency depending mainly upon the configuration and the potentials applied to the electrodes 1 and 1' and 2.

The oscillations of the electrons set up electrical variations in the electrode 2. Said variations may be detected by any method well known to those skilled in the art.

In certain cases it may be advantageous to associate two or more conductive rods 9 and 10 with the electrode 2 to serve as radiating elements.

Figure 2:
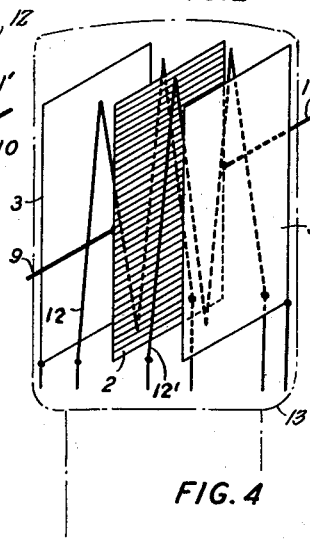
Fig. 2 illustrates an electronic device provided with screening members.

In Fig. 2 there is shown an arrangement similar to that of Fig. 1 but wherein two filamentary cathodes (electron sources) 12 and 12' are employed in conjunction with auxiliary electrodes 3 and 3' which have among their functions that of preventing certain electrons from getting lost on the glass envelop and of distributing the electrons generated by the cathodes associated therewith more uniformly.

Figure 3:
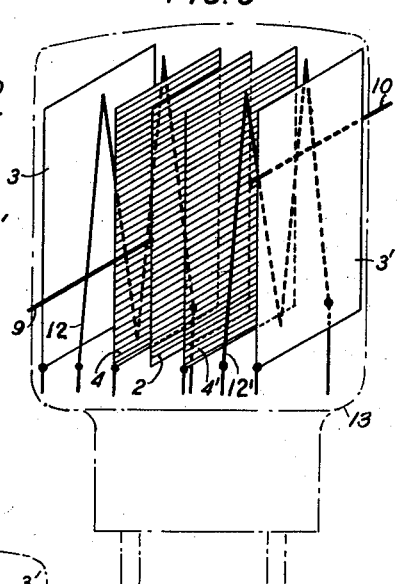
Fig. 3 illustrates an arrangement similar to that of Fig. 2 with the addition of a pair of accelerating electrodes.

Fig. 3 illustrates an arrangement analogous to that of Fig. 2, and in which additional electrodes 4 and 4' are provided for biasing (e. g. accelerating) the movements of the electrons. These additional electrodes have to be connected to suitable sources of electric potential.

Figure 4:
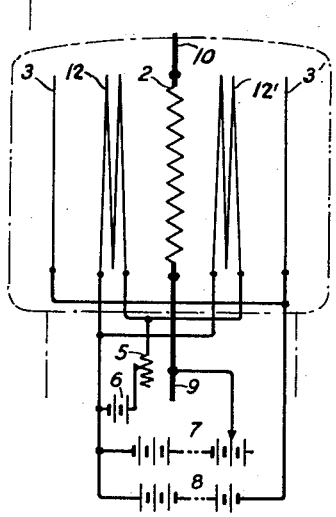
Fig. 4 is a schematic diagram of a convenient circuit connection for the elements illustrated in Fig. 2.

Fig. 4 shows a circuit diagram of the arrangement of Fig. 2 in which the controlling and actuating electrode 2 is connected to a radiating system 9 and 10 and, a point suitably chosen along said radiating system is connected to a high positive potential provided by source 7, which is shown as a battery but may be constituted by any source whatsoever of direct or alternating potential.

The filamentary cathodes 12 and 12' are fed by a suitable source such as battery 6 through rheostat 5. It may be advisable to use a separate source for each of cathodes 12 and 12' particularly when it is desired to compensate for dissymmetry in the cathodes. The auxiliary or screening (repelling) electrodes 3 and 3' are shown both connected to the same terminal of a D. C. source 8. The potential for the electrodes 3 and 3' may alternatively be obtained by connecting said electrodes to suitable points in the circuit such as for instance at suitable points in the filaments 1, 1', thereby rendering the discharge device more simple.

Figure 5:
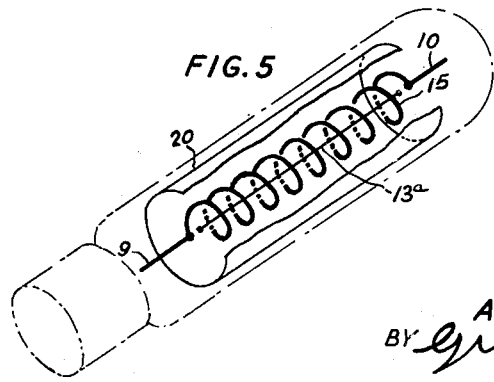
Fig. 5 illustrates the adaptation of a controlling and actuating electrode in an electronic device whose electrodes form a cylindrical structure.

Fig. 5 illustrates an alternative form of actuating and controlling electrode. The repelling electrode 20, which functions similarly as electrode 3 of Figs. 2 to 4, inclusive, here takes the form of a cylinder. The actuating and controlling electrode 15, which has the form of a helix, has each of its two extremities connected to an individual one of the radiating elements 9, 10. The radiating system is constituted by said radiating elements 9, 10 forming substantially a linear oscillatory system capable of being excited by the oscillatory movements of the electrons. In order to obtain in the radiating system oscillations of maximum amplitude it is necessary, everything else remaining unaltered, that there be a certain parity between the frequency of the oscillatory movements of the electrons and the natural frequency of the radiating system. A single electron source is employed in the specific embodiment of this figure, this being shown as a linear filamentary cathode 13a in the axis of the helix.

Fig. 6 illustrates the use of a "transformer electrode" said electrode being illustrated in the form of two concentric helicoidal conductors 15 and 16, with the terminals of one conductor connected to points of the radiating system similarly as in Fig. 5, while the terminals of the other conductor are adapted to be connected as by leads 14 to associated circuits. Such an arrangement may, for example, be used for coupling a plurality of sets of electrodes each of which forms a unit and/or for further adapting a discharge device of the type set forth for modulation and/or amplification purposes.

In some cases experiments have shown that it is desirable to employ an equivalent filamentary cathode of comparatively great length and in such cases the arrangement illustrated in Fig. 7 may be used. In this case the arrangement comprises two units of electrodes, (although more than two units may be used), the filamentary cathodes being connected in series with each other and the controlling and actuating electrodes being similarly connected, all of which elements are as disclosed in Fig. 5. Among the advantages of this construction is the possibility afforded thereby of preventing the sagging of a long filament by dividing it into a plurality of sections which may be supported in the vicinity of their points of interconnection. This is very important since certain properties of the device depend largely upon its geometrical symmetry.

Another fundamentally important feature of the arrangement of Fig. 7 resides in the possibility of locating each generator unit (i. e. a group comprising a source of electrons, a controlling and actuating electrode and auxiliary electrodes if used) at suitable points, which may be determined experimentally so as to improve the radiating properties of the system. A further advantage of this arrangement consists in the possibility of simplifying the arrangement for transmitting the resultant high frequency waves to the radiators by locating the said units at the proper places. As shown high frequency transmission lines are entirely dispensed with, the radiators being integral with the circuits in which the waves are generated.

Figs. 8 and 9 illustrate circuit arrangements in which an emissive electrode 17, a controlling and actuating electrode 18 and auxiliary electrode 19 are provided. In Fig. 8 the said electrode 18 is terminated by two radiating members 9 and 10. At a point in one of said members is connected the positive terminal of a battery 7. In Fig. 9 the battery has its corresponding terminal connected to a point of symmetry in the controlling and actuating electrode 18.

Fig. 10 shows the association of two electronic devices whose controlling and actuating electrodes 18 and 18' are connected so as to form a local closed circuit. Two points of symmetry of said circuit are connected to two radiating members 9 and 10. In consequence of the use of two controlling and actuating electrodes there are similarly provided two sources of electrons 17 and 17' and two auxiliary electrodes 19 and 19' interconnected as shown. The oscillations set up in the controlling and actuating electrode 18 are, by means of the said electrical connections, adapted to interact with the oscillations set up in the electrode 18' and due to a certain synchronizing effect even with slightly dissymmetrical electronic devices the oscillatory energy in the radiating 9, 10 is greater with two devices so associated than with only one.

It is obvious that more than two electronic devices may be associated according to the principle hereinbefore exemplified for two such devices.

A plurality of electronic devices interconnected, according to the various ways hereinbefore described, may be located within the same envelop and associated according to numerous different types of symmetry.

Although various structures have been described in order to illustrate a few features of the invention it should be noted that the present invention may be embodied in organizations widely different from those outlined above. For example in Fig. 1 there is shown the elements of a discharge device whose electrodes are symmetrically arranged in a plane but it is obvious that other types of symmetry may be used, for instance the sources of electrons, the controlling and actuating electrode and the auxiliary electrodes may be symmetrically arranged about an axis. As specific examples one may mention electrodes (cathodes, controlling and actuating electrodes etc.) of cylindrical or prismatical shapes, all of them arranged symmetrically about an axis.

What is claimed is:

1. In a high frequency wave generating apparatus, in combination, a pair of electron emitting means and means adapted to continuously excite them to electron emission, an electron actuating and controlling means therebetween, means for impressing a positive potential bias with respect to said emitting means on said actuating and controlling means to adapt it to continuously attract the electrons from said emitting means, said actuating and controlling means having an open mesh structure whereby the electrons traversing the path between said emitting means and said actuating and controlling means tend to overshoot said last mentioned means and hence to be subsequently attracted theretoward in a relatively opposite direction so that the electrons tend to oscillate in space at a frequency determined by the length of paths and the actuating force of said actuating and controlling means, separate energy absorbing and radiating means responsive to the oscillations of said electrons, a pair of reflecting or repelling electrodes symmetrically positioned in the paths of said electrons outside of said electron emitting means with respect to the central actuating and controlling means, and means adapted to continuously negatively bias said reflecting and repelling electrodes with respect to said emitting means.

2. In a high frequency wave generating apparatus, in combination, a pair of electron emitting means and means adapted to continuously excite them to electron emission, an electron actuating and controlling means therebetween, means for impressing a positive potential bias with respect to said emitting means on said actuating and controlling means to adapt it to continuously attract the electrons from said emitting means, said actuating and controlling means having an open mesh structure whereby the electrons traversing the path between said emitting means and said actuating and controlling means tend to overshoot said last mentioned means and hence to be subsequently attracted theretoward in a relatively opposite direction so that the electrons tend to oscillate in space at a frequency determined by the length of paths and the actuating force of said actuating and controlling means, separate energy absorbing and radiating means responsive to the oscillations of said electrons, a pair of electron biasing means positioned between said electron emitting means and said actuating and controlling means and symmetrical therewith, and means adapted to continuously apply an electron accelerating potential with respect to said emitting means to said biasing means.

3. In a high frequency wave generating apparatus, in combination, a pair of electron emitting means and means adapted to continuously excite them to electron emission, an electron actuating and controlling means therebetween, means for impressing a positive potential bias with respect to said emitting means on said actuating and controlling means to adapt it to continuously attract the electrons from said emitting means, said actuating and controlling means having an open mesh structure whereby the electrons traversing the path between said emitting means and said actuating and controlling means tend to overshoot said last mentioned means and hence to be subsequently attracted theretoward in a relatively opposite direction so that the electrons tend to oscillate in space at a frequency determined by the length of paths and the actuating force of said actuating and controlling means, and separate energy absorbing and radiating means responsive to the oscillations of said electrons, said separate responsive means comprise absorbing and radiating members integrally attached to said actuating and controlling means.

ANDRÉ GABRIEL CLAVIER.